H. B. Smith.
Wheel Plow.
N° 93,154. Patented Jul. 27, 1869.

Witnesses,
A. W. Almquist
Oscar Hinchman

Inventor,
H. B. Smith
Munn & Co
Att'ys

UNITED STATES PATENT OFFICE.

H. B. SMITH, OF TREMONT, ILLINOIS.

IMPROVEMENT IN COMBINED PLOW, CULTIVATOR, AND POTATO-DIGGER.

Specification forming part of Letters Patent No. 93,154, dated July 27, 1869.

*To all whom it may concern:*

Be it known that I, H. B. SMITH, of Tremont, in the county of Tazewell and State of Illinois, have invented a new and Improved Combined Plow, Cultivator, and Potato-Digger; and I do hereby declare that the following is a full, clear, and exact description thereof, which will enable others skilled in the art to make and use the same, reference being had to the accompanying drawings, forming part of this specification, in which—

Figure 1:
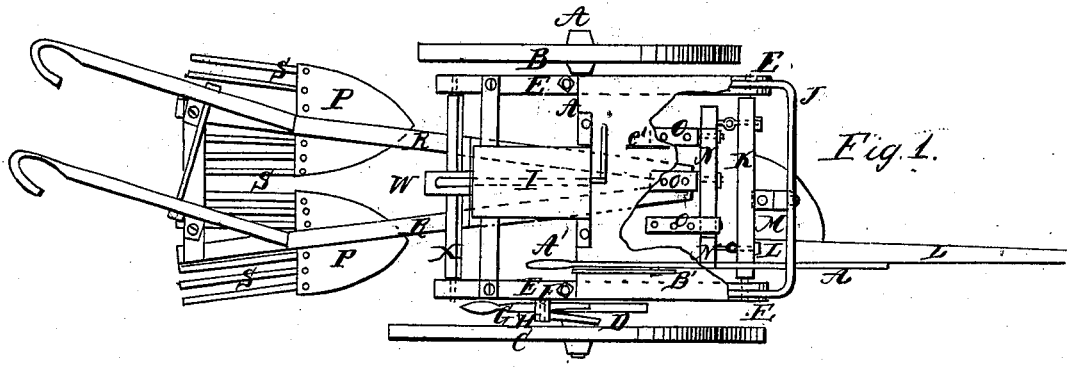
Figure 2:
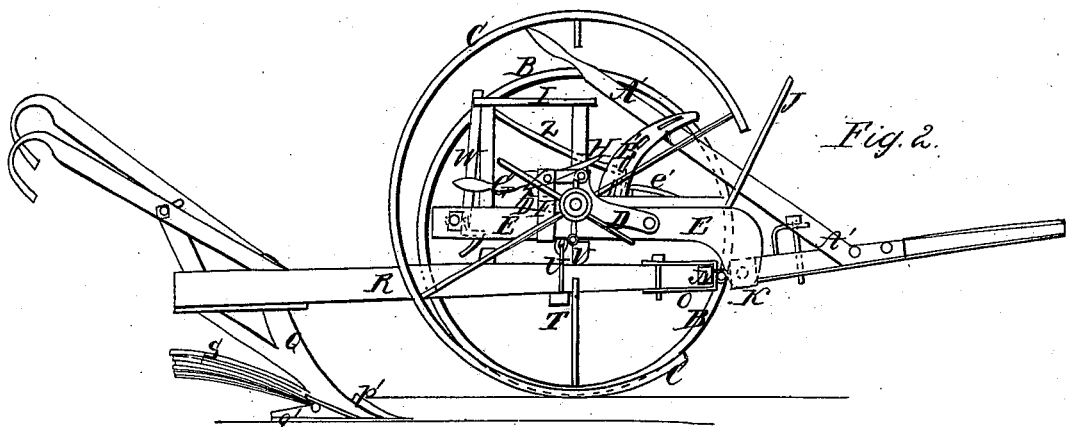
Figure 3:
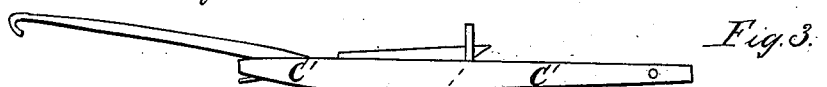
Figure 4:
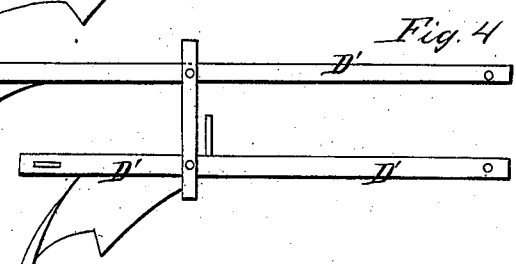

Figure 1 is a top or plan view of my improved machine, part of the platform being broken away to show the construction. Fig. 2 is a side view of the same. Fig. 3 is a top view of a single plow adapted for use in my improved machine. Fig. 4 represents a gang of plows adapted for use with my improved machine.

Similar letters of reference indicate corresponding parts.

My invention has for its object to furnish an improved combined plow, cultivator, and potato-digger which shall be so constructed and arranged as to be easily adjusted and operated, and which will do its work well in either capacity; and it consists in the construction and combination of the various parts of the machine, as hereinafter more fully described.

A is the axle, which is made with a journal or spindle only upon its landside end, to receive the landside-wheel B.

The furrow-wheel C is made larger than the wheel B, and works upon a journal or spindle attached to the lever D, the forward end of which is pivoted to the forward part of the side bar of the frame E, and the rear end of which has a shoulder or catch formed upon it and enters a long keeper, F, attached to the side bar of the said frame E.

In the upper part of the keeper F is pivoted a lever, G, the forward end of which is pivoted to an ear formed upon the lever D, so that by operating the said lever the relative position of the frame E and axis of the wheel C may be changed as desired, enabling the frame E to be kept level, whether the wheel C runs in a furrow or upon a level with the wheel B.

H is a lever-pawl pivoted to the upper part of the keeper F, and the toe of which takes hold of the shoulder or catch of the lever D, to hold it securely when lowered.

The frame E is securely attached to or framed into the axle A, and to it is attached the driver's seat I. The forward part of the frame E is covered, to form a platform for the convenience of the driver, and to its forward end is attached an upwardly-projecting guard, J. The forward end of the frame E projects downward, and to it are pivoted the journals of the roller K, to which, near one end, the tongue L is attached, so that the machine may be used with one, two, or three horses, as may be required. The connection between the tongue L and roller K is strengthened by the brace-block M, which may be made in the shape of a quarter of a circle, or triangular, and which also furnishes a support for the draft attachment.

N is a bar similar to the roller K, which is connected to said roller K by eyebolts or equivalent jointed connections, and to which the plow-beams are connected by clevises O, swiveled or otherwise adjustably attached to said bar. The clevises O should be made long, to enable beams of different lengths to be so attached to them that the plows may be in proper position with reference to the frame E. The frame, plow-beams, and tongue are thus connected to each other with a universal-joint connection.

P are the plow-plates, which are made in about the shape shown in Figs. 1 and 2. The plates P are slotted from their rear edges, and have small tongues or caps $p'$ welded or otherwise attached to their forward parts just in front of the forward ends of the said slots, to form sockets to receive the forward ends or toes of the standards Q, which standards are so formed that their heels $q'$ may project horizontally to form a base for the said plows to give them steadiness. The plates P are still further steadied by rods passing through holes in the said standards Q, beneath the rear parts of the plates P, as shown in Fig. 2. The upper ends or top plates of the standards Q are securely attached to the rear parts of the beams R. The beams R may be inclined toward each other, as shown in Fig. 1, so as to be secured to a single clevis; or they may be parallel with each other, in the manner shown in Fig. 4.

To the rear edges of the plates P are attached fingers S, to loosen the soil when used as a cultivator and to separate the potatoes when used as a potato-digger.

T is a cross-bar passing beneath the plow-beams, and connected at its ends to the frame E by rods U, the lower ends of which are attached to the said bar T, and the upper ends of which hook upon eyebolts or staples attached to the said frame E.

V is a bar hinged to the frame E, so that it may be turned down, when desired, upon the plow-beams to hold them steady, as shown in Fig. 2.

W is a catch-lever attached to a roller, X, the ends of which are pivoted to the frame E. Upon the lower end of the lever W is formed a catch, as shown in Fig. 2, which, when the rear end of the frame E is lowered, takes hold of a cross-bar or pin attached to the beams or beam of the plows or plow, so that the said plows or plow may be raised from the ground by raising the rear end of the frame E. The lever W is operated by the rod Z, attached to the upper end of said lever-catch, and extending forward into such a position that the stirrup formed upon its forward end may be readily reached and operated by the driver with his foot.

e' is a catch attached to the platform of the frame E, for the stirrup of the rod Z to catch upon to hold the catch W in connection with the plow-beams.

A' is a lever, the forward end of which is rigidly attached to the tongue L, and which projects upwardly and rearwardly into such a position that it may be conveniently reached and operated by the driver from his seat. Upon the side of the lever A' is formed a catch, which takes hold of the curved catch-bar B', attached to the frame E, so as to hold the said lever securely in any position in which it may be placed. This enables the frame E to be adjusted and held in any desired position.

It should be observed that when the plows P Q S are used for cultivating purposes they should be attached to the beams R at such a distance apart as to pass one upon each side of the row of plants being cultivated. When the plows P Q S are used for digging potatoes, they are attached to the beams R side by side and close together.

C' represents a large strong plow, which is designed to be used alone, and attached to the machine in the manner hereinbefore described.

D' represents a gang of lighter plows, which are designed to be connected with the machine in the manner hereinbefore described.

All the different plows may be provided with handles, so that they may be used without the machine when desired.

Having thus described my invention, what I claim as new, and desire to secure by Letters Patent, is—

1. The combination of the tongue L, roller K, bar N, clevis or clevises O, frame E, lever A', and catch-bar B' with each other, substantially as herein shown and described, and for the purpose set forth.

2. The hinged bar V and pendent swinging bar T, when arranged with relation to the frame E and the plow-beams, as herein described, for the purpose specified.

3. The combination of the roller X, catch-lever W, and stirrup-rod Z with the frame E, substantially as herein shown and described, and for the purpose set forth.

4. The combination of the lever D, to which the spindle of the furrow-wheel C is attached, lever G, keeper F, and lever-pawl H with each other and with the frame E, substantially as herein shown and described, and for the purpose set forth.

H. B. SMITH.

Witnesses:
   JNO. F. SMITH,
   W. R. JOHNSON.